(12) United States Patent
Chang et al.

(10) Patent No.: US 8,088,447 B2
(45) Date of Patent: Jan. 3, 2012

(54) SULFONATED POLYETHER ETHER KETONE KETONE, FILM UTILIZING THE SAME, AND METHOD FOR MANUFACTURING THE SAME

(75) Inventors: Chung-Liang Chang, Hsinchu (TW);
Ming-Chou Chen, Zhubei (TW);
Ko-Lun Hsu, Kaohsiung (TW);
Hsing-Chieh Li, Changhua (TW);
Chi-Han Hsieh, Miaoli County (TW);
Peter Po-Jen Chu, Hsinchu County (TW)

(73) Assignees: Industrial Technology Research Institute, Hsinchu County (TW); National Central University, Taoyuan County (TW)

( * ) Notice: Subject to any disclaimer, the term of this patent is extended or adjusted under 35 U.S.C. 154(b) by 423 days.

(21) Appl. No.: 12/477,108

(22) Filed: Jun. 2, 2009

(65) Prior Publication Data

US 2010/0166966 A1    Jul. 1, 2010

(30) Foreign Application Priority Data

Dec. 26, 2008   (TW) ............................... 97150829 A

(51) Int. Cl.
*B05D 5/00* (2006.01)
*B05D 5/12* (2006.01)

(52) U.S. Cl. .......................... 427/385.5; 562/46; 562/52
(58) Field of Classification Search .............. 427/385.5; 562/46, 52
See application file for complete search history.

(56) References Cited

U.S. PATENT DOCUMENTS

| | | | | |
|---|---|---|---|---|
| 3,661,937 A | * | 5/1972 | Dombro | 549/235 |
| 3,716,516 A | * | 2/1973 | Dombro | 524/112 |
| 4,240,974 A | * | 12/1980 | Little et al. | 558/46 |
| 4,459,351 A | * | 7/1984 | Adin et al. | 430/445 |

* cited by examiner

*Primary Examiner* — Gregory Delcotto
(74) *Attorney, Agent, or Firm* — Pai Patent & Trademark Law Firm; Chao-Chang David Pai

(57) ABSTRACT

A series of crosslinkable sulfonated poly(ether ketone)s containing cycloalkenyl groups were synthesized by aromatic nucleophilic substitution reaction. To decrease the swelling of fuel cell membranes, crosslinking of theses polymers by radical polymerization has been explored. These polymeric films exhibit good thermal and oxidative stability, and good dimensional stability in hot water. The proton conductivity of one example at room temperature is $7.52*10^{-2}$ S/cm. The results showed that these materials containing cycloalkenyl groups are possible inexpensive candidate materials for proton exchange membranes in fuel cell applications.

12 Claims, 3 Drawing Sheets

SULFONATED POLYETHER ETHER KETONE KETONE, FILM UTILIZING THE SAME, AND METHOD FOR MANUFACTURING THE SAME

CROSS REFERENCE TO RELATED APPLICATIONS

This Application claims priority of Taiwan Patent Application No. 097150829, filed on Dec. 26, 2008, the entirety of which is incorporated by reference herein.

BACKGROUND OF THE INVENTION

1. Field of the Invention

The present invention relates to proton exchange membranes, and in particular relates to the composition and the formula for improving degree of swelling and dimensional stability of the proton exchange membranes.

2. Description of the Related Art

Film or membrane is important for many industrial fields. Films are modified according to specific properties for application as perm-selective membranes, or so-called proton exchange membranes, for electro analysis, electrolysis, dialysis, or fuel cells. Fuel cells directly transfer chemical energy to electrical energy, wherein an anode and a cathode are separated by a proton exchange membrane. As such, only protons transfer through the membrane.

Sulfonated poly(ether ketone)s, is one type of ion exchange membrane used for operating temperatures less than 70° C. Ion exchange sulfonated poly(ether ketone) membranes have chemical stability, thermal stability, and mechanical strength. However, under operating temperatures higher than 70° C., ion exchange sulfonated poly(ether ketone) membranes dramatically swelled and eventually dissolved. Nevertheless, if problems with dimensional deformation at high temperatures can be solved, then ion exchange sulfonated poly(ether ketone) membranes would be a very suitable proton exchange membrane in fuel cells due to its excellent electrochemical properties.

Accordingly, a novel sulfonated poly(ether ketone) with improved chemical stability and mechanical strength for high temperature fuel cells is called for.

BRIEF SUMMARY OF THE INVENTION

The invention provides a sulfonated poly(ether ether ketone ketone) having a formula as:

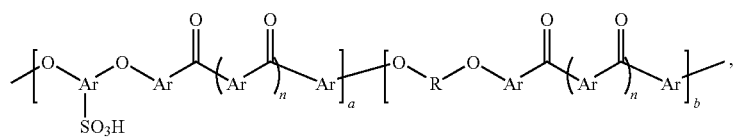

wherein R has a formula:

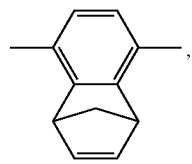

Ar is independently selected from phenyl, naphthyl, anthryl, or phenanthryl, n is an integer of 0 to 2, and a and b have a ratio of 95:5 to 70:30.

The invention also provides a film formula, comprising the sulfonated poly(ether ether ketone) as described above, and a radical initiator.

The invention further provides a method for manufacturing a film, comprising dissolving the film formula as described above in a solvent to form a solution, forming the solution on a substrate and providing energy to radical crosslink the sulfonated poly(ether ether ketone), and removing the solvent to form a film.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
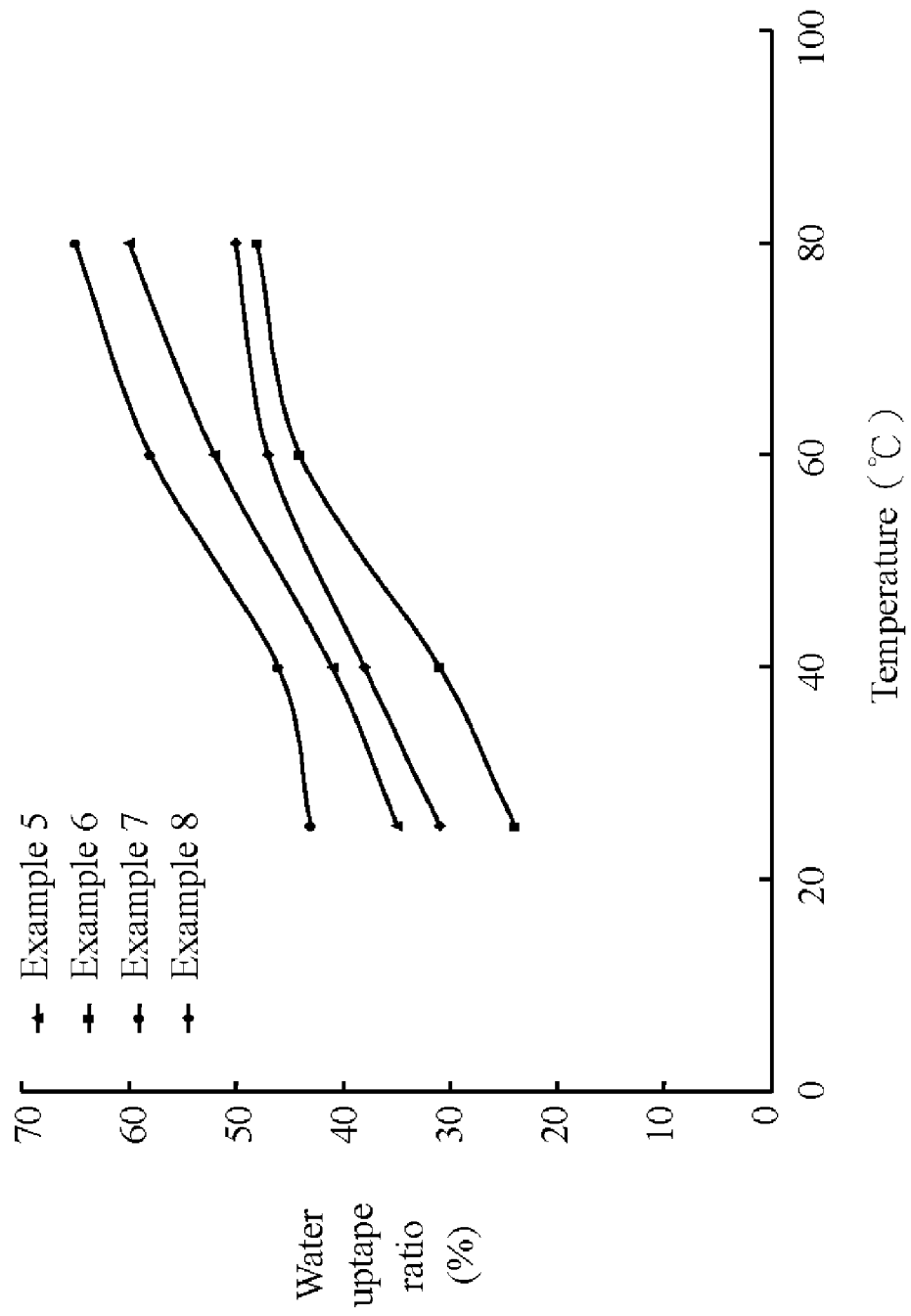
FIG. 1 shows water uptake ratio versus temperature curves of the films in Examples.

The following description is of the best-contemplated mode of carrying out the invention. This description is made for the purpose of illustrating the general principles of the invention and should not be taken in a limiting sense. The scope of the invention is best determined by reference to the appended claims.

The invention provides a sulfonated poly(ether ketone) (hereinafter SPEEKK) as shown in Formula 1:

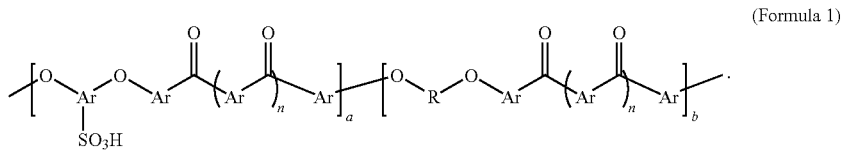
(Formula 1)

In Formula 1, R is shown as Formula 2:

(Formula 2)

In Formula 1, each Ar is independently selected from phenyl, naphthyl, anthryl, or phenanthryl. For example, the substitution position of the hydroxyl and the sulfonated group of a phenyl (Ar) can be ortho, meta, or para. n is an integral of 0 to 2, and a and b have a ratio of 95:5 to 70:30. When "a" is a higher ratio, the radical crosslinking degree is lower and the film has a higher water uptake ratio and higher dimensional deformation ratio at high temperatures. When "a" is a lower ratio, the film has lower proton conductivity and lower ion exchange capacity of about $10^{-3}$ to $10^{-2}$ S/cm.

The synthesis of SPEEKK in Example 1 is shown as Formula 3:

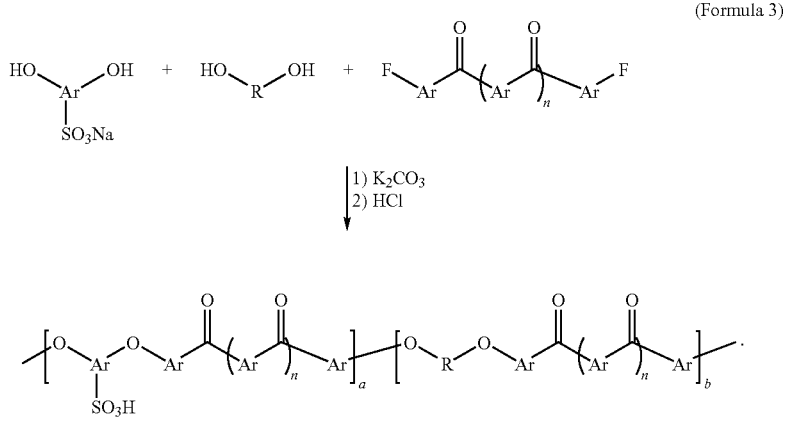
(Formula 3)

Subsequently, the described SPEEKK and radical initiator are dissolved in a solvent, the solution is formed on a substrate by a spin-on coating, spray coating, dipping, solvent casting, or rolling process. The solution layer is applied an energy to crack the radical initiator to form radicals, thereby crosslinking the double bond of the cycloalkenyl group (R). The energy type depends on the radical initiator types. For example, the energy for the thermal initiator is heat, and the energy for the photo-initiator is light with an appropriate wavelength.

The photo-initiator can be acetophenone such as 2-methyl-1-(4-(methylthio)phenyl)-2-morpholino-propane, 1-hydroxycyclohexyl phenyl ketone, diethoxyacetophenone, 2-hydroxy-2-methyl-1-phenyl-propane-1-one, 2-benzyl-2-(dimethylamino)-1-[4-(morpholinyl)phenyl]-1-butanone, and the likes. The photo-initiator further includes benzoin such as benzoin methyl ether, benzyl dimethyl ketal, and the likes. Suitable photo-initiator can be benzophenone, 4-phenyl benzophenone, hydroxyl benzophenone, and the likes. In addition, the photo-initiatorcan can be thioxanthone such as isopropyl thioxanthone, 2-chlorothioxanthone, and the like. Anthraquinone such as 2-ethylanthraquinone and the likes is suitable as the photo-initiator. The described photo-initiators can be utilized alone, or in combinations thereof to obtain faster photosensitive rates, e.g. a combination of isopropyl thioxanthone and 2-benzyl-2-(dimethylamino)-1-[4-(morpholinyl)phenyl]-1-butanone.

The thermal initiator includes azo compound such as 2,2'-azobis(2,4-dimethyl valeronitrile, dimethyl 2,2'-azobis(2-methylpropionate, 2,2-azobisisobutyronitrile (AIBN), 2,2-azobis(2-methylisobutyronitril, 1,1'-azobis(cyclohexane-1-carbonitrile, 2,2'-azobis[N-(2-propenyl)-2-methylpropionamide], 1-[(cyano-1-methylethyl)azo]formamide, 2,2'-azobis(N-butyl-2-methylpropionamide, 2,2'-azobis(N-cyclohexyl-2-methylpropionamide, and the likes; peroxide such as benzoyl peroxide, 1,1-bis(tert-butylperoxy)cyclohexane, 2,5-bis(tert-butylperoxy)-2,5-dimethylcyclohexane, 2,5-bis(tert-butylperoxy)-2,5-dimethyl-3-cyclohexyne, bis(1-(tert-butylpeorxy)-1-methyl-ethyl)benzene, tert-butyl hydroperoxide, tert-butyl peroxide, tert-butyl peroxybenzoate, cumene hydroperoxide, cyclohexanone peroxide, dicumyl peroxide, lauroyl peroxide, and the likes. The described photo-initiators can be utilized alone, or in combinations thereof if necessary.

In one embodiment, the SPEEKK solution and the radical initiator of the film formula have a weight ratio of 100:2 for crosslinking. In one embodiment, the film formula may further include a double-bond compound such as a silane containing a double-bond, divinyl benzene, or alkenyl oligomer, and/or a triple-bond compound.

Because the cycloalkenyl group of the SPEEKK in the film formula is crosslinked by the radical initiator, the degree of swelling and the dimensional deformation ratio of the film at high temperatures are efficiently reduced. Moreover, the film also has excellent oxidative stability to be applied as a high temperature proton exchange membrane.

EXAMPLES

Example 1

Synthesis of Cycloalkenyl Diol

As shown in Formula 4, p-benzoquinone was dissolved in dichloromethane and purified by recrystallization. 21.62 g of the purified p-benzoquinone (200 mmol) was dissolved in 500 mL of methanol (95%), and slowly added 17.55 mL of cyclopentadiene (260 mmol) at −78° C. Subsequently, the mixture was slowly stirred from a temperature of −78° C. to room temperature, then reacted at room temperature for 8 hours, and recrystallized by methanol to obtain 31.36 g of a product (90% yield). The product of Formula 4 had the hydrogen spectrum as follows: $^1$H NMR (200 MHz in CDCl$_3$): δ 1.23-1.26 (dd, 1H), 1.37-1.40 (dd, 1H), 3.18 (s, 2H), 3.51 (s, 2H), 6.02 (s, 2H), 6.53 (s, 2H, CH═CH).

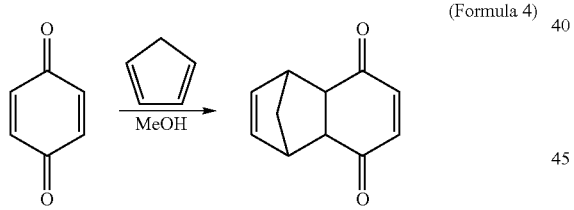

(Formula 4)

Following, as shown in Formula 5, the product of Formula 4 was dissolved in 15 mL of pyridine, and slowly added 7.5 mL of acetic anhydride in an ice bath. Subsequently, the mixture was slowly stirred to room temperature (25° C.), and then reacted at room temperature for 7 days to obtain a dark brown solution. The resulting reaction was added an equal amount of ice water several times so that the bottle wall was scratched to induce crystallization, and then violently stirred to obtain a large amount of dark red precipitate at the bottom of the bottle. The precipitate was dissolved in ether and recrystallized by ethanol twice to obtain 3.82 g of a product (20% yield). The product of Formula 5 had a hydrogen spectrum as follows: $^1$H NMR (200 MHz in CDCl$_3$): δ2.22 (s, 2H), 2.31 (s, 6H), 3.89 (s, 2H), 6.65 (s, 2H, CH═CH), 6.80 (s, 2H).

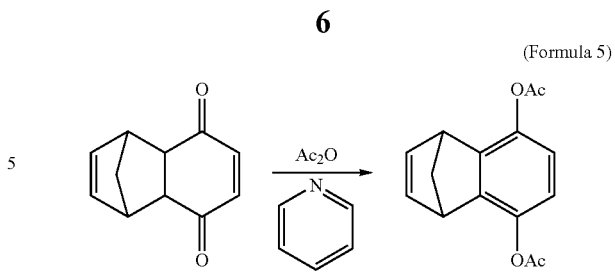

(Formula 5)

Following, as shown in Formula 6, 13.5 g of the product in Formula 5 (200 mmol) was dissolved in dry ether, slowly added LAH in an ice bath, slowly stirred under a nitrogen environment, and then left at room temperature to react for 24 hours. The resulting reaction was added distillated water in an ice bath to neutralize the un-reacted LAH, and then added hydrochloric acid until the organic layer became transparent. The mixture was vacuumed by a rotation evaporator to remove ether, and then recrystallized by chloroform to obtain 6.58 g of a product (90% yield). The product of Formula 6 had a hydrogen spectrum as follows: $^1$H NMR (200 MHz in CDCl$_3$): δ 2.18-2.20 (dd, 1H), 2.23-2.25 (dd, 1H), 4.08 (s, 2H), 4.39 (s, 2H, —OH), 6.35 (s, 2H, CH═CH), 6.79 (s, 2H).

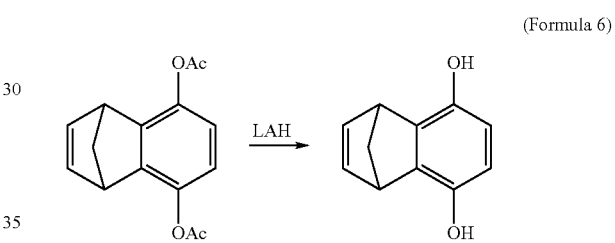

(Formula 6)

Example 2

1.85 g of 1,3-bis(4-fluorobenzoyl)benzene (5.70 mmol, commercially available from Aldrich), 1.35 g of 2,3-dihydroxy-naphthalene-6-sulfonic acid monosodium salt (5.14 mmol, commercially available from TCI), 0.1 g of cycloalkenyl diol product of Formula 6 in Example 1 (0.57 mmol), and 1.19 g of potassium carbonate (8.61 mmol) were dissolved in a co-solvent of 10 mL of N-methyl-2-pyrrolidone (NMP) and 10 mL of toluene. The solution was heated to 160° C. for 4 hours and then distilled out the toluene. The NMP solution was heated to 175° C. for 48 hours. After the polymerization, at room temperature, 100 mL of methanol was added and a purple red solid was precipitated and filtered. The filtered cake was washed with distilled water and methanol several times, and then dried in a vacuum oven to obtain 2.85 g of a product (86% yield). The described reaction was shown as Formula 7, wherein a and b had a molar ratio of 9:1. The product of Formula 7 had a hydrogen spectrum as below: $^1$H NMR (300 MHz in DMSO-d$_6$): δ 8.18 (s, 1H),$^a$ 7.84-7.97 (m, 6H), 7.57-7.72 (m, 6H), 7.04 (s, 4H), 6.82 (s, 2H),$^b$ 6.72 (s, 2H),$^b$ 3.79 (s, 2H),$^b$ 2.15-2.20 (m, 2H).$^b$ (Note: $^a$ and $^b$ representing the ~9:1 molar ratio of Phenyl vs. cycloalkenyl moeities).

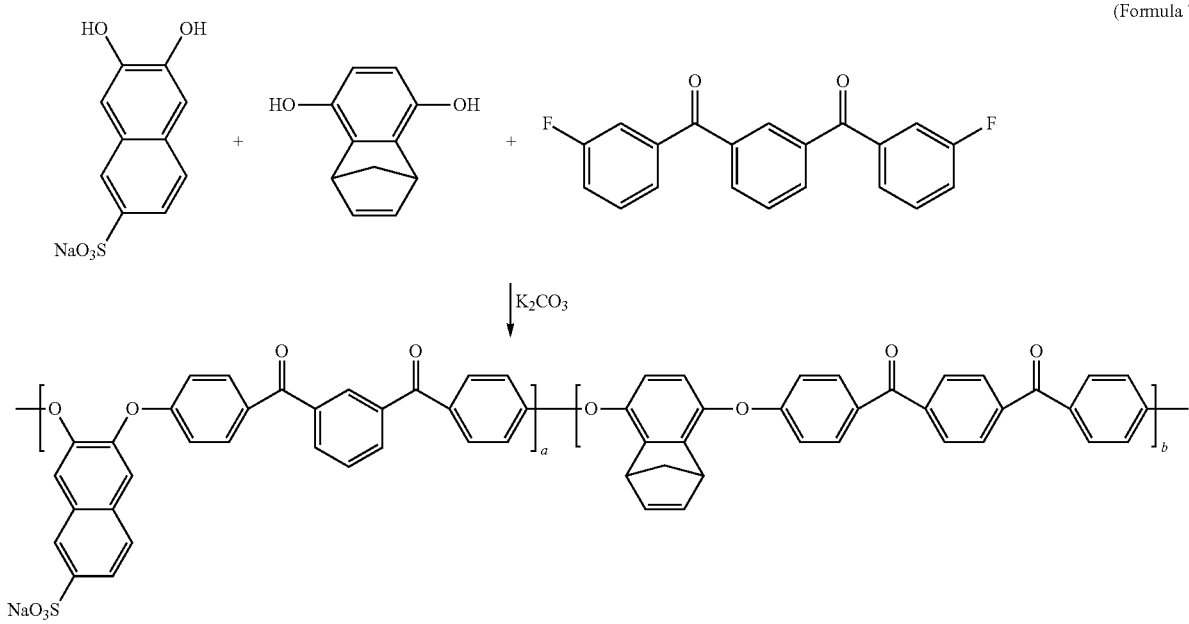

(Formula 7)

Example 3

Manufacturing of a Film

The polymer product of Example 2 (Na form) was dissolved in NMP to form a 10% NMP solution. The NMP solution was added 2 wt % of AIBN as an initiator, dropped on a glass plate by solvent casting, and then gradient heated to slowly vaporize solvent for forming a film. The gradient heating procedure was processed under a nitrogen environment, and is described as follows: heating to 85° C. to radical polymerize for 24 hours, heating to 95° C. and maintained at 95° C. for 6 hours, heating to 105° C. and maintained at 105° C. for 6 hours, and heating to 120° C. and vacuumed for 12 hours to prepare the film.

The film was dipped in a 2M HCl solution for 24 hours to replace the sodium ion on the sulfonate with proton. The acidified film was dipped in distilled water for 24 hours to remove residue acid of the film surface, wherein the distilled water was changed several times until its pH value was at a neutral level, other than an acid level.

Example 4

Similar to Example 2, wherein the only difference in Example 4 was that the molar ratio (a:b) of 2,3-dihydroxy-naphthalene-6-sulfonic acid monosodium salt and the cycloalkenyl diol product of Formula 6 in Example 1 was 8:2.

Example 5

The SPEEKK polymer of Example 2 was dissolved in NMP to form a 10% NMP solution. The NMP solution was added 2 wt % of AIBN as a thermal initiator, dropped on a glass plate, and then gradient heated to slowly vaporize solvent for forming a film. The gradient heating procedure was processed under a nitrogen environment, and is described as follows: heating to 70° C. to thermally crack the AIBN to form radicals for crosslinking the cycloalkenyl group of the SPEEKK for 12 hours, heating to 80° C. and maintained at 80° C. for 6 hours, heating to 90° C. and maintained at 90° C. for 6 hours, and heating to 110° C. and vacuumed for 12 hours to remove solvent to complete the film preparation.

Example 6

Similar to Example 5, the only difference of Example 6 was that the SPEEKK product thereof came from Example 4 other than Example 2. The AIBN ratio and heating steps of Example 6 were similar to Example 5.

Example 7

Similar to Example 5, the only difference of Example 6 was that the thermal initiator of AIBN was not used. The heating steps of Example 7 were similar to Example 5.

Example 8

Similar to Example 6, the only difference of Example 8 was that of the thermal initiator of AIBN was not used. The heating steps of Example 8 were similar to Example 6.

Figure 2:
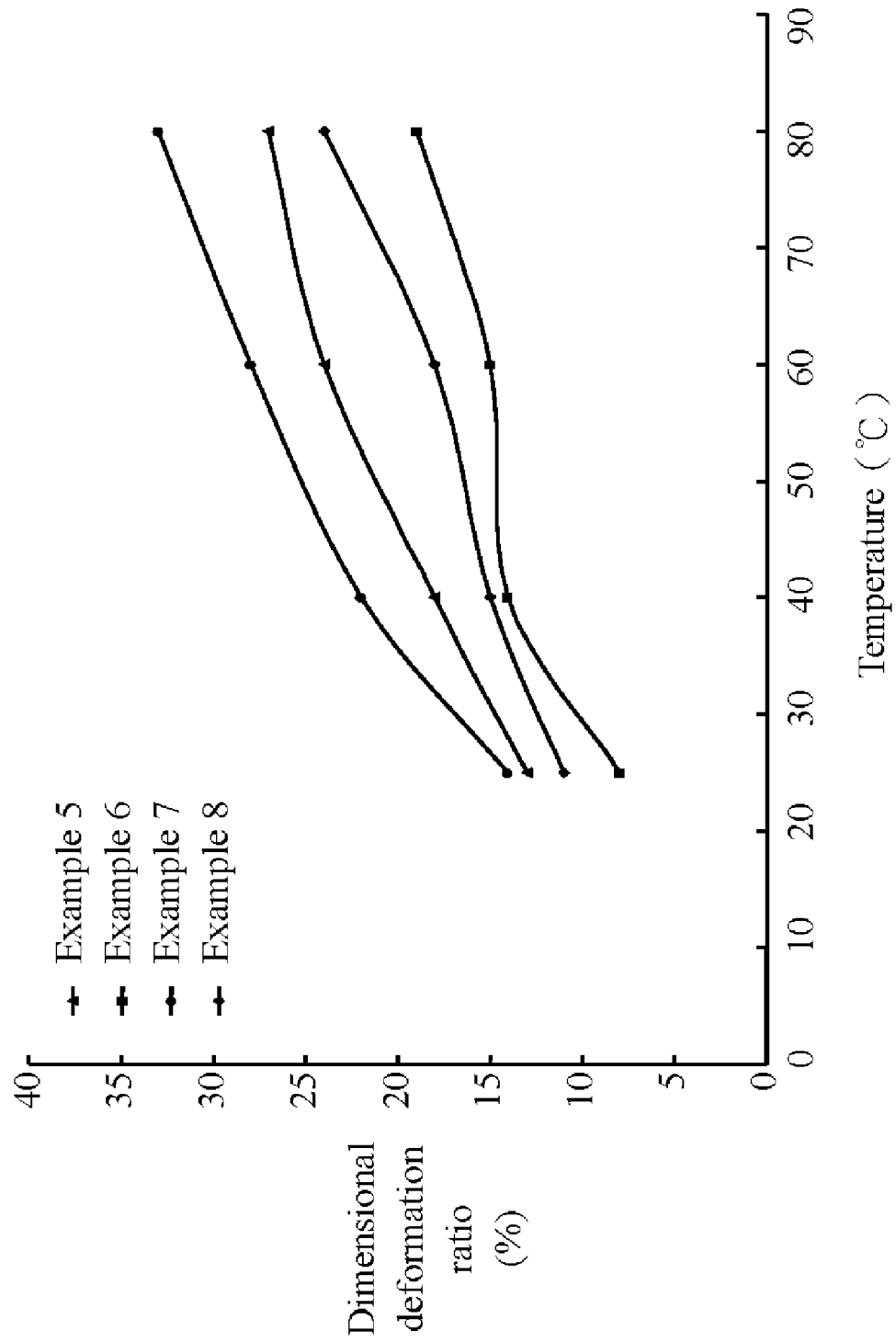
FIG. 2 shows dimensional deformation ratio versus temperature curves of the films in Examples.

Experiments showed that the film chemical structures of Examples 5 and 6 were thermally stable at temperatures over 200° C., such that the film may hold its chemical structure under thermal pressing procedures of a membrane fuel electrode. Examples 5 and 6 have sulfonated ratios of 90% and 80%, respectively. However, the films with high sulfonated ratios did not swell very much or dissolve in hot water. As shown in FIGS. 1 and 2, the films had water uptake ratio of 24% to 43% at 25° C., and dimensional deformation ratio of 8% to 14%. On the other hand, the conventional SPEEKK without the cycloalkenyl group of Formula 6 did swell and deform at temperatures over 60° C., due to high water uptake ratio. Thus, the cycloalkenyl group SPEEKK of the invention was crosslinked, thereby efficiently decreasing the water uptake ratio and degree of swelling.

In Examples 7 and 8, the formulae of forming the film eliminated the thermal initiator such as AIBN. Because the cycloalkenyl group was only partially crosslinked, the crosslink degree thereof was insufficient. As shown in FIGS. 1-2, the water uptake ratio and the degree of swelling of the films in Examples 7 and 8 could not be efficiently reduced.

Example 9

Figure 3:
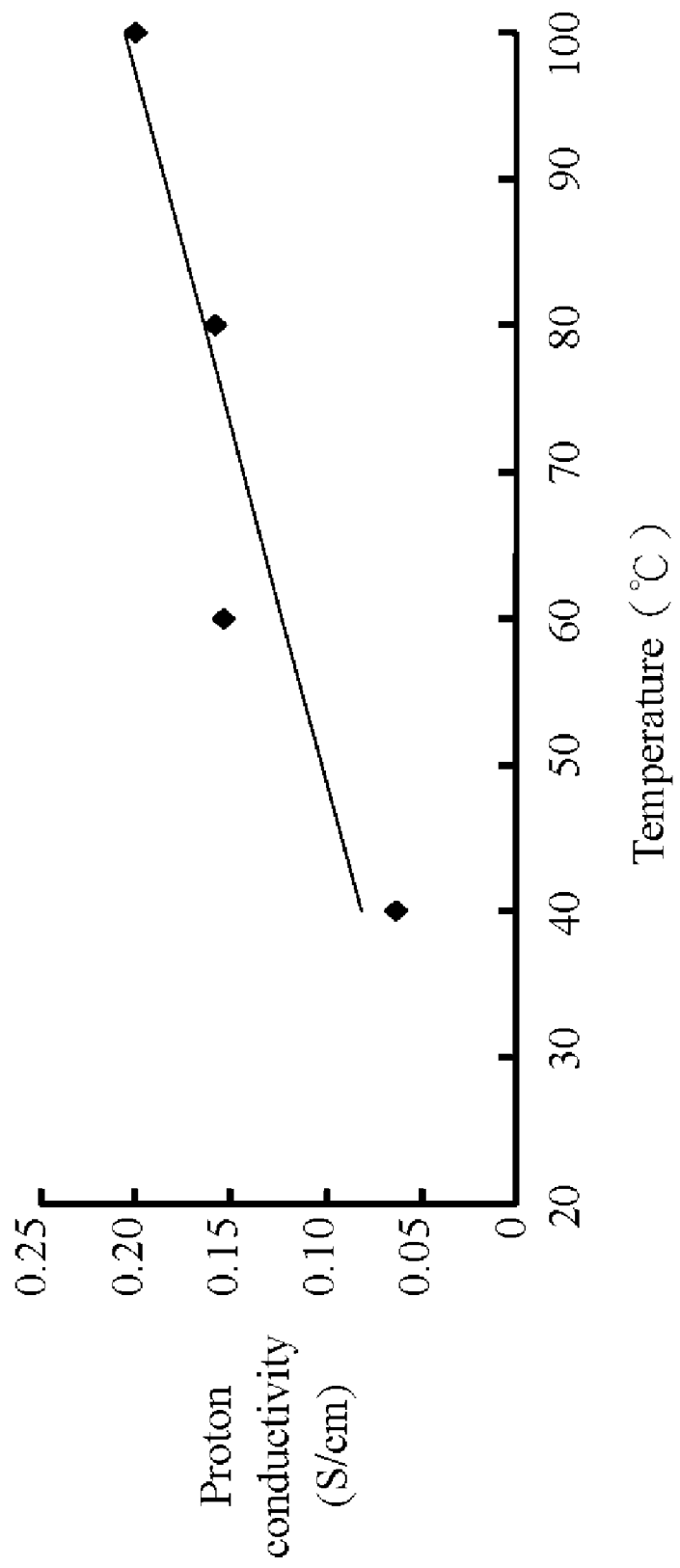
FIG. 3 shows a proton conductivity ratio versus temperature curve of the film in one Example.

The ion exchange capacity (IEC) and proton conductivity of the films of Examples 5 and 8 were measured as listed in Table 1. The films had dimensions of 5 cm*5 cm*0.01~0.02 cm, and proton conductivities of over $10^{-2}$ S/cm at room temperature. As shown in FIG. 3, the film in Example 6 had a proton conductivity of $7.52*10^{-2}$ S/cm, and a proton conductivity close to 0.2 S/cm at high humidity and high temperature. The sulfonated group of the film in Example 6 had a decomposition temperature of 205° C. and a glass transition temperature (Tg) of 226° C.

The oxidative stability of the films was measured by a Fenton's test. First, the dried films were dipped in a Fenton's reagent to check for whether the films had dissolved. If the films were not dissolved, the residue weight of the films was recorded. The Fenton's reagent was prepared by dissolving 2 ppm $FeSO_4$ in 3% $H_2O_2$. As shown in the Fenton's test, the films in Examples 5-6 had oxidative stability, thus making them applicable as high temperature proton exchange membranes.

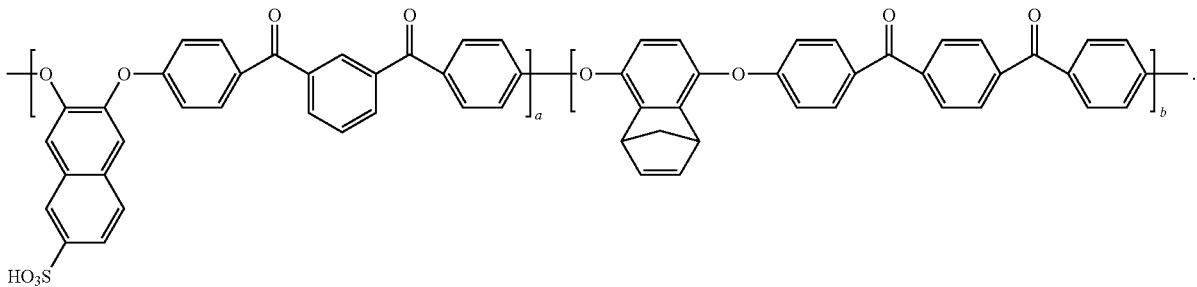

TABLE 1

|  | Example 5 | Example 6 | Example 7 | Example 8 |
| --- | --- | --- | --- | --- |
| AIBN | 2 wt % | 2 wt % | 0 | 0 |
| Sulfonated degree | 90% | 80% | 90% | 80% |
| Ion exchange capacity (mmol/g) | 1.81 | 1.79 | 1.75 | 1.83 |
| Proton conductivity (S/cm) (25° C.) | $5.06 * 10^{-2}$ | $7.52 * 10^{-2}$ | $8.61 * 10^{-3}$ | $3.94 * 10^{-2}$ |

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A sulfonated polyether ether ketone having a formula:

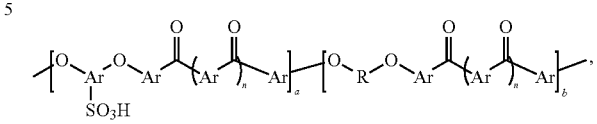

wherein R has a formula:

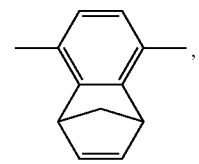

Ar is independently selected from phenyl, naphthyl, anthryl, or phenanthryl;

n is an integer of 0 to 2; and a and b have a ratio of 95:5 to 70:30.

2. The sulfonated polyether ether ketone as claimed in claim 1 having the formula:

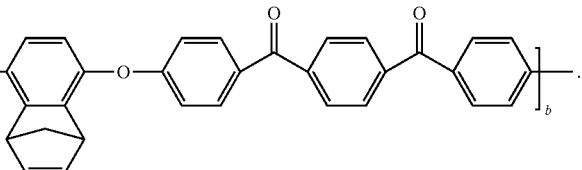

3. A film formula, comprising:
   the sulfonated polyether ether ketone as claimed in claim 1, and
   a radical initiator.

4. The film formula as claimed in claim 3, wherein the radical initiator comprises a photo initiator or a thermal initiator.

5. The film formula as claimed in claim 3, further comprising a double-bond compound and/or a triple-bond compound.

6. The film formula as claimed in claim 5, wherein the double-bond compound comprises silane, divinyl benzene, or alkenyl oligomer.

7. A method for manufacturing a film, comprising:
   dissolving the film formula as claimed in claim 3 in a solvent to form a solution;
   forming the solution on a substrate and providing an energy to radical crosslink the sulfonated polyether ether ketone; and
   removing the solvent to form a film.

8. The method as claimed in claim 7, wherein the energy comprises light or heat.

9. The method as claimed in claim 7, further comprising a step of adding a double-bond compound and/or a triple-bond compound to the solution, wherein the sulfonated polyether ether ketone, the double-bond compound and/or the triple-bond compound are radical crosslinked by the energy.

10. A film comprising the crosslinked polyether ether ketone as claimed in claim 1.

11. The film as claimed in claim 10, further crosslinking a double-bond compound and/or a triple-bond compound.

12. The film as claimed in claim 11, wherein the double-bond compound comprises silane, divinyl benzene, or alkenyl oligomer.

* * * * *